United States Patent [19]

Sheehy

[11] Patent Number: 4,745,525

[45] Date of Patent: May 17, 1988

[54] LIGHTED TAILGATE FOR PICKUP TRUCK

[76] Inventor: Paul M. Sheehy, 8334 S. Fields Cir., Sacramento, Calif. 95828

[21] Appl. No.: 20,432

[22] Filed: Mar. 2, 1987

[51] Int. Cl.[4] .............................................. F21V 7/04
[52] U.S. Cl. ........................................ 362/32; 362/80
[58] Field of Search .......................... 362/32, 80, 293; 340/71, 106, 107, 108

[56] References Cited

U.S. PATENT DOCUMENTS

| | | | |
|---|---|---|---|
| 4,112,376 | 9/1978 | Fosnough et al. | 340/107 |
| 4,431,984 | 2/1984 | Bileck | 340/107 |
| 4,464,649 | 8/1984 | Her | 340/71 |
| 4,559,516 | 12/1985 | Schott et al. | 340/134 |
| 4,574,269 | 3/1986 | Miller | 340/97 |

FOREIGN PATENT DOCUMENTS 2546458 11/1984 France ............................... 340/107

Primary Examiner—Charles J. Myhre
Assistant Examiner—David A. Okonsky
Attorney, Agent, or Firm—Mark C. Jacobs

[57] ABSTRACT

A variable color fiber-optic lighting system for pickup trucks that utilizes an optionally changeable in color light source, disposed within the confines a pickup truck's tailgate, whose light is directed to a series of fiber-optic cables which, at one end are aligned adjacent the light source, and set out in a configuration corresponding to the trademark of the truck's vendor at their second end on the exterior of the rear side of the tailgate.

7 Claims, 4 Drawing Sheets

LIGHTED TAILGATE FOR PICKUP TRUCK

BACKGROUND OF THE INVENTION

Congress has legislated that 1986 and newer cars have a third brake light which must be disposed toward the upper middle section of the vheicle. Such legislation has not as yet been implemented for trucks. At this point it is only conjecture whether that law will be expanded for trucks.

It has been determined however through various studies that the third brake light helps to cut down rear-ender accidents. Therefore it is seen to be beneficial to provide such a system for trucks, especially pickup trucks, which are generally the size of cars. Most pickups today, have the name of the vendor spelled out in large letters on the tailgate. The instant invention utilizes these letters in the provision of a third light system that is both functional and decorative.

It is an object therefore to provide a light system that utilizes the vendor's name as the light configuration.

It is another object to provide a lighting system that is decorative as well as functional.

It is still another object to provide a light system that employs fiber-optic cables for light delivery.

Yet another object is to provide a tailgate light system that employs a variable color light source.

A still further object is to provide a tail gate light system that employs two different bulbs as the light source.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in conjunction with the accompanying drawings.

SUMMARY OF THE INVENTION

A pickup truck third light system that employs fiber-optics wherein one end of the fiber-optic cables terminate in the configuration of the truck vendor's name disposed within the tailgate and the other end are clumped adjacent an optionally variable in color light source disposed within the tailgate.

When the car is in a driving condition, a plurality of colors will light up the vendor's name; but when the brakes are applied, the name becomes uniformly red, until the brakes are released.

DESCRIPTION OF THE PREFERRED EMBODIMENT

Figure 1A:
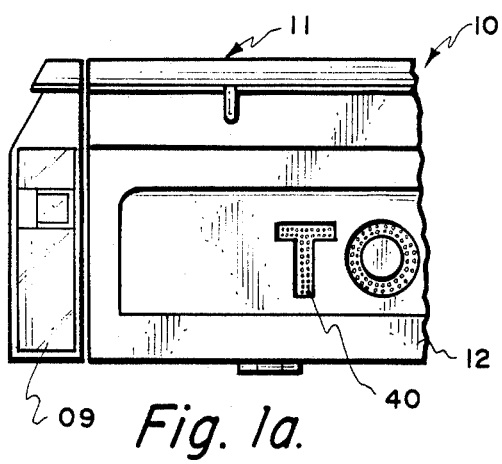
FIG. 1a and 1b is an elevational view of the rear wall of a pickup truck tailgate, with FIG. 1a showing the tailgate after the installation of this invention, and FIG. 1b being before the installation of the invention.
Figure 1B:
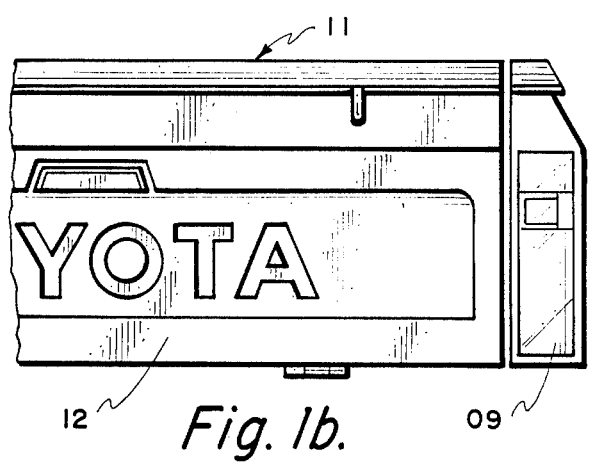

The invention herein comprises a supplemental lighting system that is embedded into the tailgate of a pickup truck. In order to understand the invention, a brief discussion of the tailgate of a pickup truck often just called a pickup is in order. Reference is therefore made to FIG. 1 which is broken into two parts, the left being FIG. 1a shows the left side of the tailgate 11, after installation of the instant lighting system, while FIG. 1b shows the same tailgate 11, but on the right side, before the installation of the system. From a distance, they do appear similar. This is due to the use of fiber-optics as will be explained below in depth.

Figure 2:
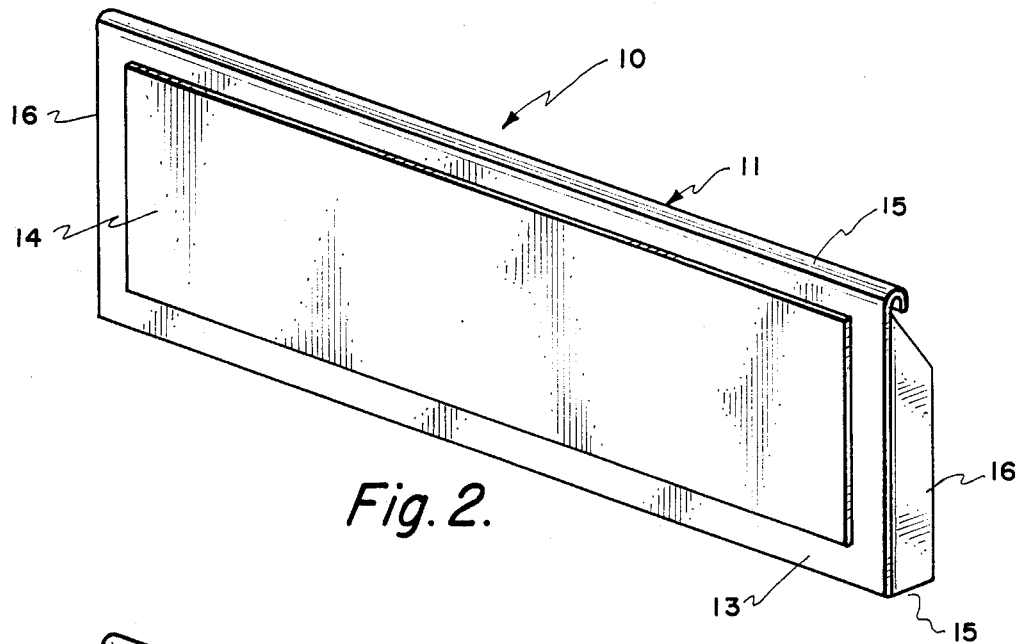
FIG. 2 is an perspective view of the front wall of a pickup truck tailgate.

Tailgate 11 is a generally rectangular hollwo structure which includes an exterior wall 12, an interior wall frame 13, —seen in FIG. 2, an interior wall 14, which is secured to the frame 13 by conventional sheet metal screws not seen. Tailgate 11 also includes a pair of spaced top and bottom walls 15 and spaced sidewalls 16, normally disposed relative to said top and bottom walls. Designators 09 found in FIG. 1a and b refer to the side panels of the pickup to better depict the environment for the invention. But these side panels are not a part of the invention.

Figure 3:
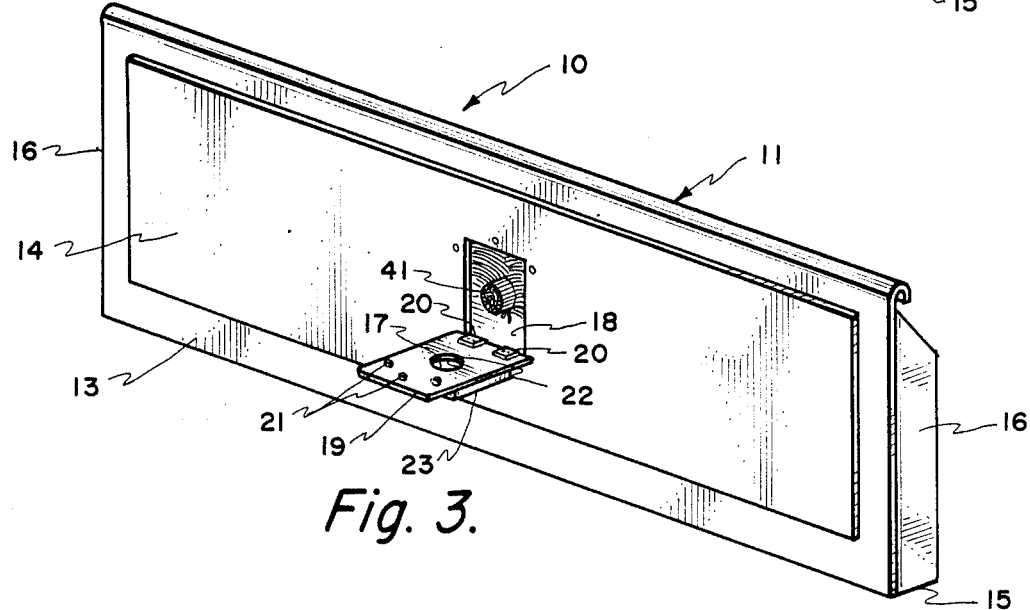
FIG. 3 is a view similar to FIG. 2 showing a panel having been cut from the front wall of the tailgate and then reafixed to thereby form an accessible cavity within the tailgate.
Figure 8:
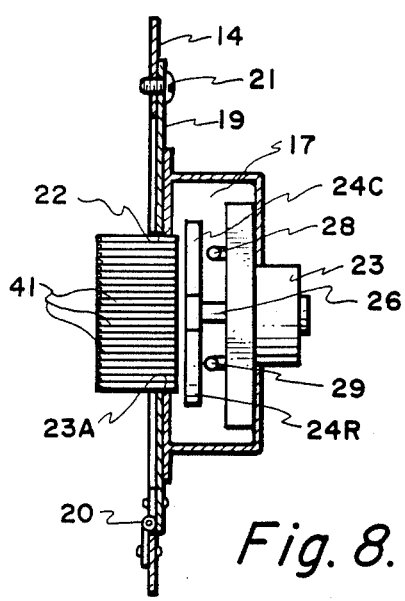
FIG. 8 is a diagrammatic view showing the operation of the instant invention.

Turning now to FIG. 3 we see that panel 14 is shown attached to the frame 13. In order to form the opening 18 in the front wall 14, said panel may remain attached to the frame 13 or be removed therefrom as may be desired or is convenient for the operator. Panel 19 is formed during the cutting operation performed on wall 14. As shown in FIG. 3, this panel is secured to wall 14 by conventional hinges 20, either before or after a bore 22 of any suitable configuration, is placed in said panel 19. Bore 22 is sized slightly larger than is necessary to receive bundle of fiber cables 41. The motor unit 23 shown in FIG. 3 and 4, as well as in more detail in FIG. 5, such that the shaft 26 can freely rotate therein without impingement in the interior 17 of motor unit 23. Note also the color wheel 24 of FIG. 5. As seen in FIG. 8, the segments 24C and 24R refer to clear and red colored plastic. Clear is suggested for one portion of the color wheel and red for the other for the reasons to be discussed below.

Figure 4:
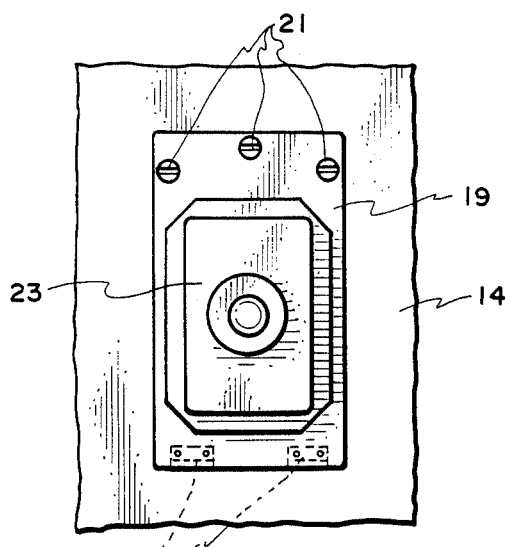
FIG. 4 is a cutaway closeup view of the panel of FIG. 3 in the closed position.

In FIG. 4, panel 19 is shown retained in place in a closed position by conventional screw clips 21. Of course any other type of retaining means may be employed to hold panel 19 in a closed position adjacent the exterior wall 14.

Prior to discussing the installation of the fiber-optics cables and the completion of the invention, it is necessary for the reader to have a basic background about fiber-optics.

Fiber-optics is the technique of transmitting light through long thin flexible fibers of glass, plastic or other transparent materials. For more detail, reference is made to the McGraw Hill Dictionary of Scientific & Technical Terms, Copyright 1978. For the flexible fibers, often called cables, I preferably employ flexible acrylic rods, of a diameter between 20 and about 30 mm, preferably colorless. These cables are readily available in the marketplace from several vendors either singly or in bundles.

Figure 7:
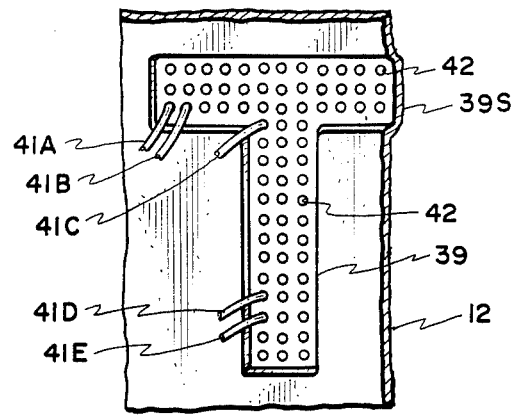
FIG. 7 is a closeup elevational view of a part of the exterior surface of the rear wall of the tailgate.

Thus on turning to FIG. 1, the display 40 already formed in the configuration of the T of the word Toyota is seen. The formation of this display 40, i.e. the entire letter T, is shown in its several steps in FIG. 7. The letter T, designated 39 has an array of apertures 42 bored through the thickness of the T which as seen is embossed on wall 12. An individual fiber-optic cable 41 is placed into and through each aperture. The Figures are designated 41a, 41b and 41c respectively. As is seen these are extending forward from the aperture, such that in a step not shown they can be cut flush with the surface 39S of the letter T, and glued in place as per cables 41D, and 41E.

Figure 5:
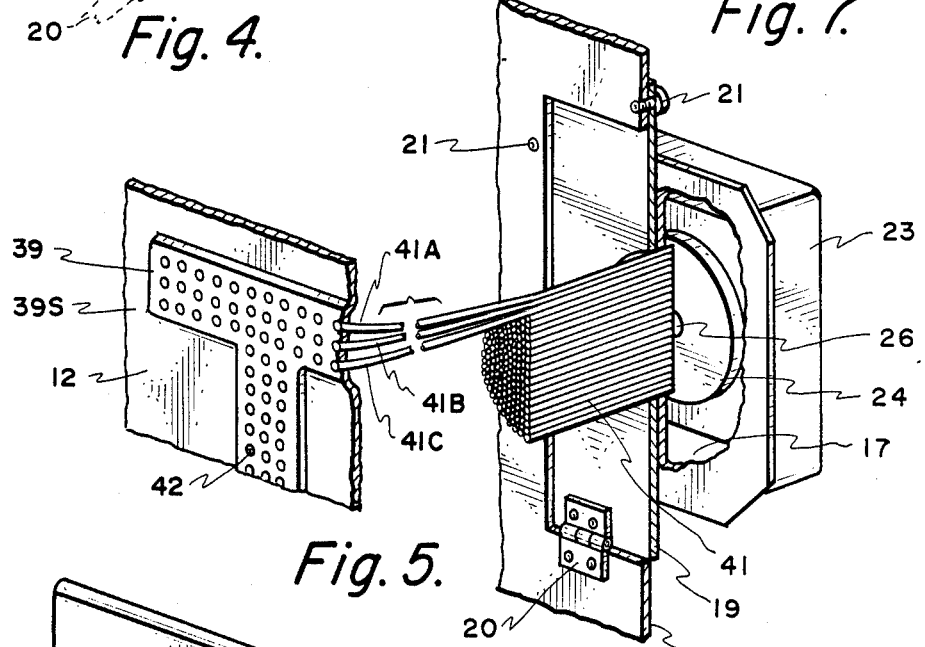
FIG. 5 is a perspective view of the front of one element of this invention.
Figure 6:
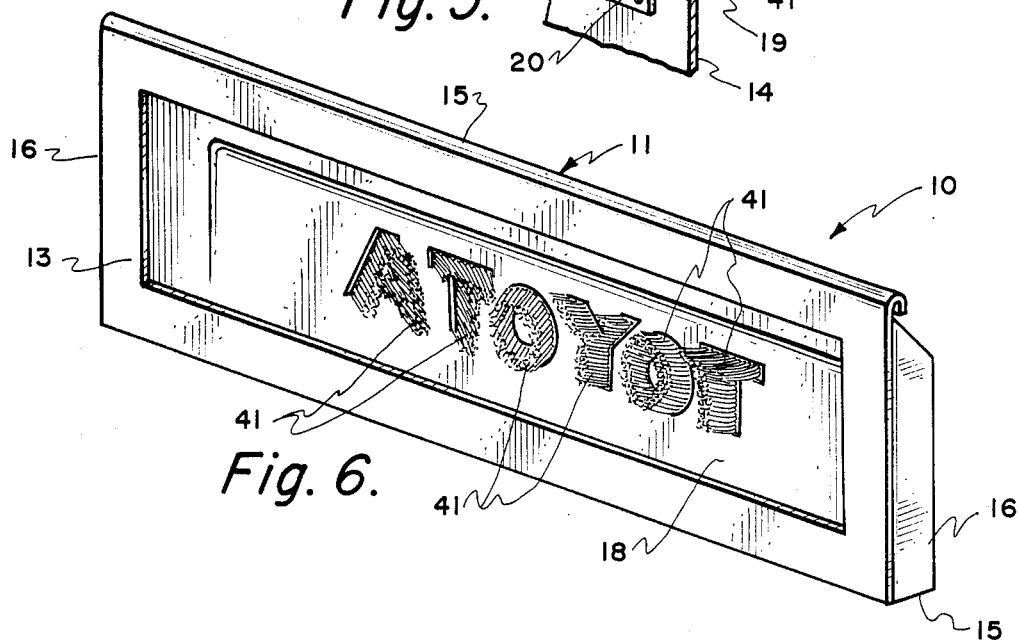
FIG. 6 is a perspective view of a pickup truck tailgate with the front wall removed.

This construction can also be discerned by reference to FIG. 5 which shows the same three fiber-optic cables 41A, B, and C disposed adjacent the color wheel 24 and disposed within the bores 42 the T 39. Any suitable non-solvent glue available in the marketplace can be used to retain the individual cables within their respective bores. More details on the process will be recited below.

PROCEDURE FOR FIBER-OPTIC CABLE INSTALLATION AND ASSEMBLY

Step one—first make a template approximately $4\frac{1}{2} \times 4\frac{1}{2}$ inches square with a grid pattern of approximately $\frac{1}{8}'' \times \frac{1}{8}''$. While the working area should be $4\frac{1}{2} \times 4\frac{1}{2}$, it may be beneficial to have an undrilled peripheral band, to aid in the disposition of template on the letter in question. By providing an X from the upper left to the lower right and upper right to lower left corners within each square, one can locate the center of each individual square. A small hole should be drilled into the plastic at the center of each X. In preparing these holes use a drill bit of approximately size 6/32nds.

Step two—set the square template upon the first letter of the vendor's logo and retain it in place as by masking tape or other suitable adhesive. When the template is in place drill a hole on the letter surface i.e. 39S, prescoring each of the holes within the template. Use a 5/32nds drill bit for all of the holes. After all holes are drilled, sand both front and back of each of the hole (bore) so that no rough edges remain. Move the template to the next adjacent location, and overlap one row of holes with the template, to assure correct alignment then tape the template into place and continue scoring the metal by creating a small indentation with a punch or awl at the location of each hole. Continue the drilling process until the total letter has been punched out.

Step three—The next step involves the cutting of the back of the tail gate i.e. interior panel front wall 14. With the front wall 14 attached to the front frame 13 or after having removed the said wall from the said frame, an opening is made in the front wall 14 in the approximate center of the horizontally disposed plurality of letters. Affix two hinges in line as shown in the figure to secure the front panel to the front wall of the tailgate.

Step four—Cut the plurality of fibers to approximately 18" in length. Using a hot stove or hot iron, place the bundle of fibers 41 against a hot stove plate or hot iron to blunt the first end of each cable. Blunting each fibre, one is able to lock the individual fiber into the aperture during the course of this process.

Step five—Place the fibers in each hole until the letter comprising the plurality of 4" square work zones is completed. After all of the individual fibers are in there respective apertures, heat the plurality of fibers slightly to lock them in place in there respective aperture. Optionally heating one or more of the cables at one time, bend and direct the individual cables toward the panel formed in the front wall.

After completing these tasks reattach the front wall 14 to the front frame 13. Form a hole approximately $3\frac{1}{4}''$ in diameter in the front panel, extend all of the non-locked ends of each individual glass cable to this $3\frac{1}{4}''$ hole.

Reinspect to confirm that the first end of each cable disposed within its aperture is not extending past the surface of the aperture. If so cut extra material and dispose thereof. Apply a coat of Joli Glaze or other equivalent adhesive to ensure that the frictionally engaged fibers are specifically retained within the desired location at the edge of there individual aperture. Allow the adhesive to cure for 12 hours.

After the Joli Glaze has hardened, warm the bundle of fibers such that they become flexible but not to a melt condition, and place them within the $3\frac{1}{4}''$ hole. Extend the fibers through said hole and cut to a length such that about $\frac{1}{2}''$ of each fiber of the bundle extends through the panel about a $\frac{1}{2}''$. Due to the large number of individual fibers, they will be retained in place frictionally within this $3\frac{1}{4}''$ hole.

Step 6—Electrical Installation—Attach the light means in parallel with the wiring to the brake lights such that upon actuation of the brakes, the bulb of the light source is turned on.

Step 7—Attachment of motor assembly—The motor asembly is secured to the interior panel or wall of the tailgate. It may be mounted internally or externally as may be desired. Of course, if exteriorly, it must be shielded from the weather and impact. One way of mounting is illustrated in the drawings. The motor of the color wheel is electrically connected directly to the electrical system of the truck such as to operative at all times that the truck is running; or a dashboard switch—not shown—can be interposed in this conventional circuit such that the motor only runs when turned on. An alternate electrical connection is to the brake light wiring such that the color wheel is actuated only when the brakes are applied. The mode of electrical connection can be chosen by the user.

The color wheel 24 may include one or more colors of plastic to change the color of light being transmitted therethrough. It has been found that clear and red in alternating pie shaped segments provides a most interesting effect.

Figure 12:
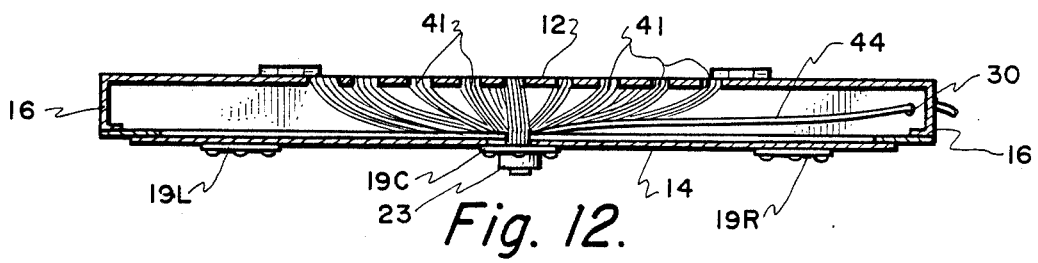
FIG. 12 is a top plan cutaway view of a second variation of the instant invention.
Figure 13:
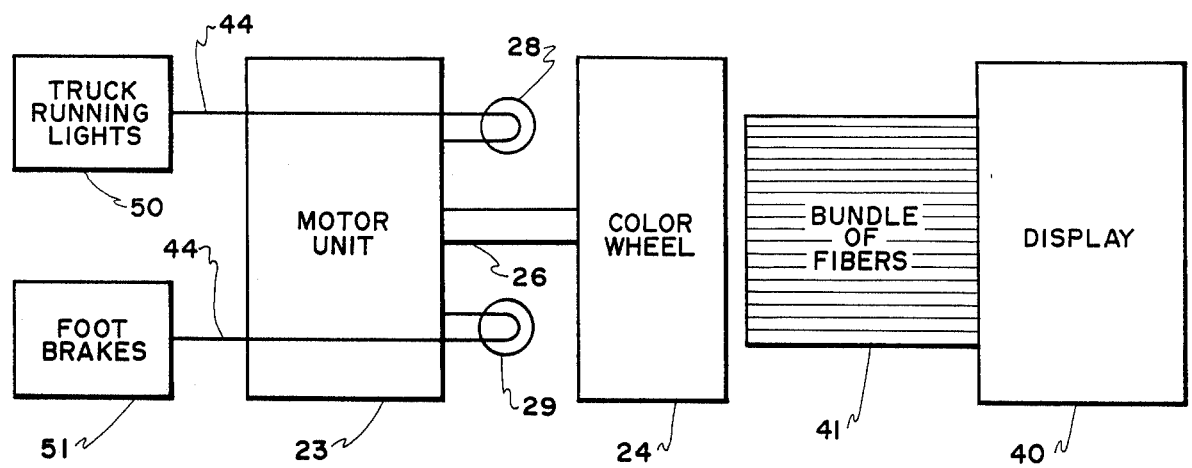
FIG. 13 is a circuit diagram employed with this invention.

Operation—When the truck has its running lights on, 50, the bulbs 29 which is the white light bulb will be operative such that the display 40 will vary in color as the disk i.e. color wheel 24 rotates. However when the brakes 51 are applied, the bulb 29 will be energized instead. Since the color wheel 24 includes red and transparent portions, when the red flows through the red portion of the disk the display will appear red and when the red light flows through the transparent portion it will still be red. Therefore the entire display flows through the transparent portion it will still be red. Therefore the entire display 40 will have a uniform heavy red intense glow at the time of brake application. Reference is made to FIG. 12 which shows the flow of light from the two bulbs 28 and 29. Reference is also made to FIG. 13 the circuit diagram which shows the parallel installation of wiring from the truck lights to the motor unit 23.

It is seen that while the discussion talks of a clear section of the color wheel and a red section, these two "colors" were suggested in order to comply with the requirement that the display 40 glow bright red upon brake actuation. Any other combination of color wheel colors and light bulb colors that use the principles of additive or perhaps even subtractive color may be employed that will create the equivalent of red light being sent to the cables upon brake actuation.

Figure 10:
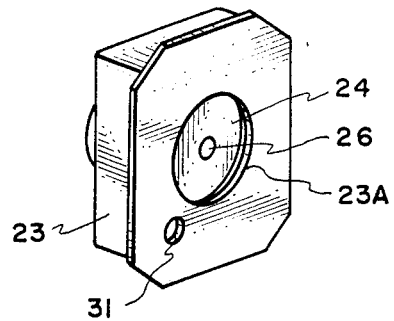
FIG. 10 is a front perspective view of the motor unit housing of this invention.
Figure 9:
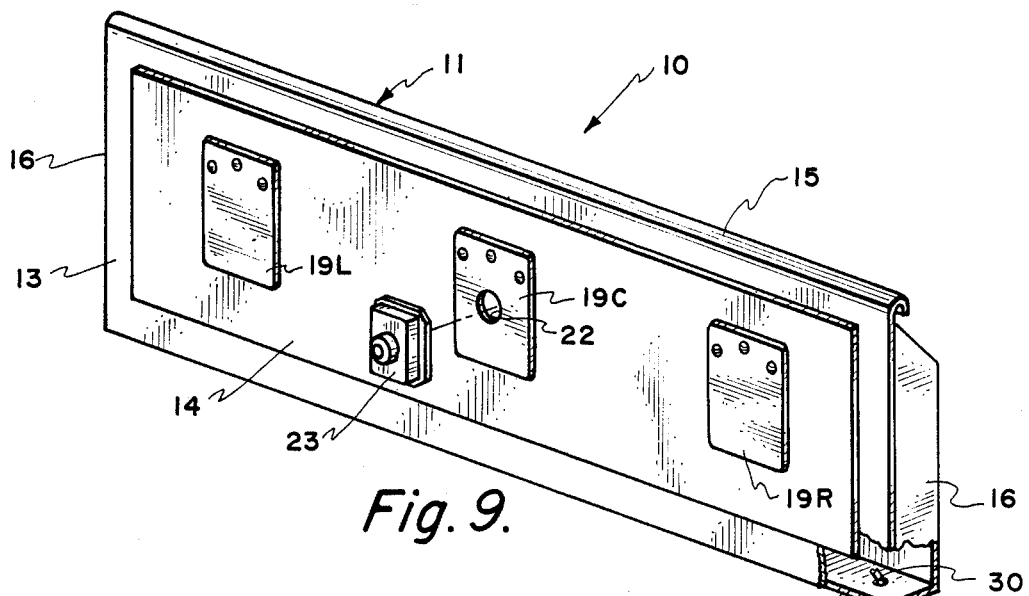
FIG. 9 is a rear elevational view of the inside of a truck tailgate showing a variant form of the invention.

Turning now to FIGS. 9 and 10 we see a variant form of the invention. Here the inward side of the tailgate merely has a bore therein 22, through which the collection of fiberoptic strands are disposed for placement adjacent motor box or housing 23. The cables or fibers 41 are reached by opening adjacent panels 19L, 19C and 19R and inserting one's hand into the interior of the tailgate. The collection of cables are wedgefit into and through opening 22 in the center panel 19C. This collection is then placed into opening 23A best seen in FIG. 10 of the housing 23 in like manner as with the previously discussed embodiment.

While shown in FIG. 9, hole 30 is to be found in both embodiments of the tailgates utilized herein, in that the wiring not seen from the lights may be brought into the tailgate for delivery to the motor housing 23 via bore 31 in housing 23. (See FIG. 10.)

Figure 11:
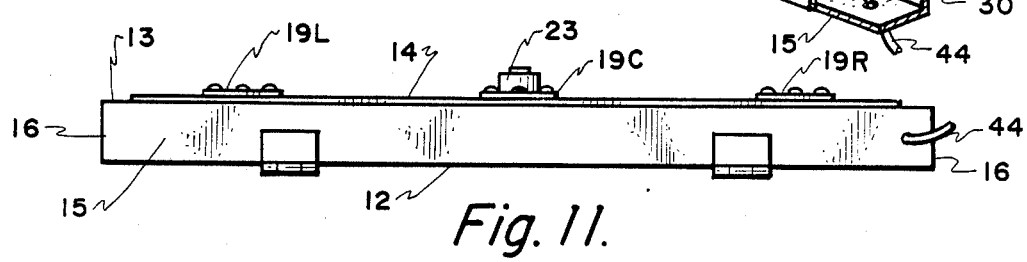
FIG. 11 is a bottom plan view of the variant form of the invention as per FIG. 13.

Reference is also made to FIGS. 11 & 12 which is a bottom & top plan view showing the relative positioning of the fibers 41, and the housing 23 which is suitably mounted on the tailgate. We seen the wire 44 exiting from hole 42 on the underside of the tailgate, which wire 44 is to be connected to the rest of the wiring of the truck at any location in order to bring power to the housing 23.

It is also to be noted that while not discussed previously, the first embodiment also employs a wire similar to 44 for connection to the tail lights or the electrical panel of the truck in order to bring power to the motor housing 23.

While shown mounted externally for after market usage, it is also to be seen that device 10 can be mounted internally within the bumper. It may require routine engineering skill to design a bumper of that nature capable of housing such a device mounted internally. See FIG. 12 for example which depicts some in a tip plan cutaway view.

Since certain changes may be made in the above product without departing from the scope of the invention herein involved, it is intended that all matter contained in the above description and shown in the accompanying drawings shall be interpreted as illustrative and not in a limiting sense.

I claim:

1. In combination with a truck's brake lights, and the truck's tailgate, a supplementary lighting system comprising
    (a) a truck tailgate having a front and rear panel spaced from each other by spaced side panels;
    (b) indicia on the rear panel configured as a series of bores through the rear panel of said tailgate;
    (c) a light means electrically connected to the brake lights and mounted on said tailgate;
    (d) a series of fiber optic cables each of which is mounted on one end in one of said bores, and on a distal end, mounted for light receiving in front of said light means, whereby on actuation of the brakes, the light means will be lit, and light will travel down the series of fiber optic cables to spell out the indicia in light.

2. The system of claim 1 wherein the front panel of the tailate has an entry bore therethrough, and the light means is mounted on an outside of the rear panel of the tailgate, with the series of fiber optic cables disposed through said entry bore in front of said light means.

3. The system of claim 1 further including light transmissible color wheel disposed in front of the light means, a motor connected to said color wheel to rotate said wheel, said motor electrically connected to a power source in said car.

4. The system of claim 2 further including a light transmissible color wheel disposed in front of the light means, a motor connected to said color wheel to rotate said wheel, said motor electrically connected to a power source in said car.

5. The system of claim 3 wherein the color wheel is rotatable and includes at least two colors, thereby providing upon rotation a changeable color to the indicia on the tailgate.

6. In the system of claim 3 wherein the color wheel motor is connected to the car's electrical system for constant operation when the car engine is running.

7. In the system of claim 3 wherein the color wheel motor is operative only when the brakes are applied.

* * * * *